Patented Aug. 7, 1945

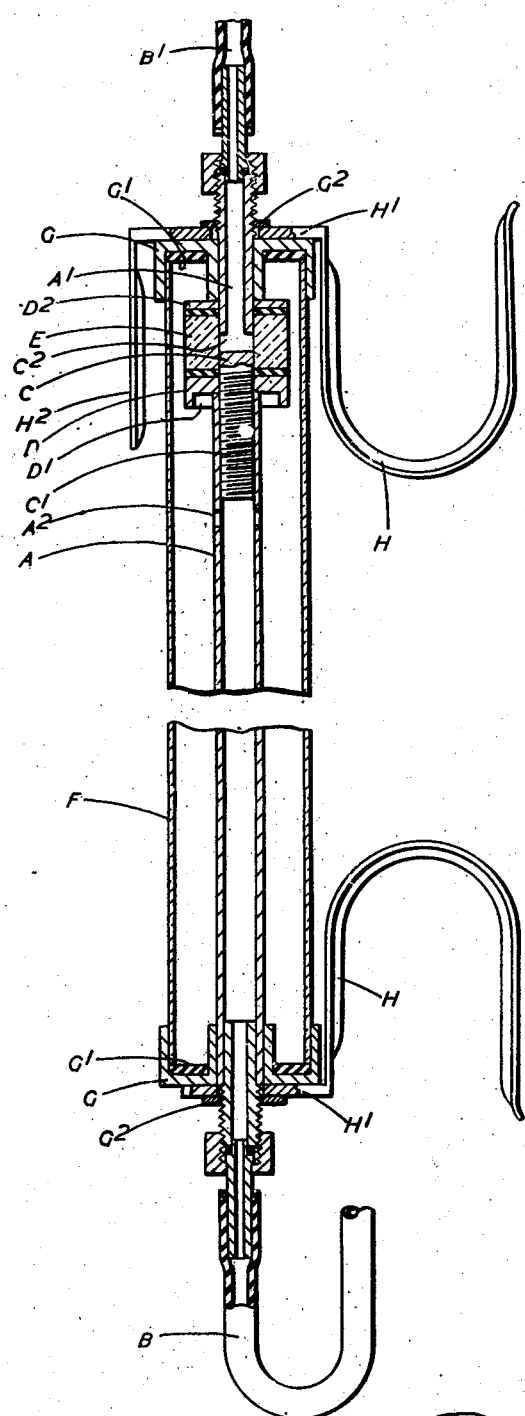

2,381,837

UNITED STATES PATENT OFFICE 2,381,837

LIQUID TRAP

Ralph Poole, London, England

Application March 14, 1944, Serial No. 526,431
In Great Britain April 5, 1943

8 Claims. (Cl. 183—44)

This invention relates to liquid traps primarily intended for use with explosive gas-detecting or like apparatus. In such apparatus a sample of the gas is drawn as by means of an aspirator through a sampling line into a detecting chamber containing an electrically heated filament. The object of the present invention is to provide means which can be connected to the sampling line to prevent the entry of liquid when the apparatus is used in conditions where there is a risk that the end of the line might be submerged as when a portable apparatus is used in ships' bilges or other places where unseen water may be present.

According to this invention a liquid trap for use with a gas sampling or detecting apparatus comprises a tube adapted to be connected to the sampling line of the apparatus, a portion of which is enclosed within an outer tube or casing in which any liquid is trapped, and this outer tube or parts of it are transparent so that any trapped liquid can be seen.

Preferably the inner tube is of approximately the same bore as the sampling line and contains a plug near its upper end, a baffle being provided which surrounds the plugged part of the tube, and openings being formed in the wall of the tube on each side of the plug. The outer and preferably transparent tube freely surrounds the baffle and is supported on the inner tube in a liquid-tight manner. Preferably the ends of the outer tube are clamped between annular caps mounted on the outer wall of the inner tube, and one of these caps is longitudinally movable so that it can be moved away from the end of the outer tube to enable liquid trapped therein to be discharged.

The bottom of each gas inlet opening in the wall of the inner tube is preferably flush with the upper face of the plug which blocks the bore of the tube. Further the baffle is preferably of annular shape and has a downwardly extending flange on its lower face so that if any liquid is carried past the baffle and through the inlet opening in the tube it will not accumulate in the upper part of the tube but will flow by gravity over the baffle and into the outer tube.

One construction according to this invention is shown by way of example in sectional elevation in the accompanying drawing.

The liquid trap comprises an inner tube A of brass or other suitable metal preferably having approximately the same bore as the flexible sampling line B of a portable gas-detecting apparatus with which it is to be used. The overall length of the tube may be about nine inches and the ends are externally screwthreaded to receive nipples by which the device is connected to flexible tubes one forming the sampling line proper B and the other $B^1$ a connection with the instrument or testing apparatus.

The inner tube comprises a main portion A which may be about seven and a half inches in length and an upper shorter portion $A^1$ about one and a half inches long. These two lengths of tube are secured together by means of a plug C which not only serves to unite the two tubes A $A^1$ but completely closes the bore where they are joined together. The plug is shown as having a screwthreaded shank $C^1$ to engage the bore of the longer tube A which is correspondingly screwthreaded and the shorter tube $A^1$ may be brazed to the face of the plug. Gas inlet slots $C^2$ are formed in the upper or shorter part $A^1$ of the tube immediately above the end face of the plug C so that the bottom of each slot $C^2$ is flush with the upper face of the plug and one or more fluid outlet slots $A^2$ are formed in the longer tube a short distance below the plug C.

Secured to the outer wall of the tube between the gas inlets $C^2$ and the fluid outlet slots $A^2$ is an annular baffle D, the outer edge of which is flanged as at $D^1$ and directed towards the lower end of the tube. In the example shown the baffle D is internally screwthreaded and is clamped on the upper end of the longer tube A by the plug C. An annular filter E of ceramic material and of the same external diameter as the baffle D is interposed between the latter and a metal washer $D^2$ so that the gas inlets $C^2$ are surrounded by the filter.

With the exception of its screwthreaded ends the tube A $A^1$ is enclosed within an outer transparent tube F of cellulose or other suitable material which has a slightly larger bore than the annular baffle D. The tube F is mounted upon the inner tube and held thereon by means of flanged end caps G. These caps have rubber or like washers $G^1$ which engage the outer ends of the tube F and they are held in contact with the ends of the transparent tube by means of nuts $G^2$ on the screwthreaded ends of the tubes A $A^1$.

In the example shown hooks H formed in one with annular plates $H^1$ are interposed between the end caps and their clamping nuts $G^2$. The curved hooks H serve as cleats for the main length of the sampling line B when the apparatus is not in use and the straight hook $H^2$ on one of the plates $H^1$ enables the device to be supported in a vertical position from the waist-belt of the operator when tests are being made.

When the device is to be used the main length of the sampling line is uncoiled and the device is supported in a vertical position as by means of the hook $H^2$, the upper end of the device being connected by a short flexible tube $B^1$ to the gas-detecting instrument which is held by or supported on a suitable harness carried by the operator. When a sample of gas is drawn into the line, as by means of an aspirator, any liquid in the sample is carried up the tube and escapes through the outlets $A^2$ so that it is caught by the overhanging flange $D^1$ of the baffle D while the gas passes through the filter E into the upper tube $A^1$. Should any liquid pass through the filter, this falls on the face of the plug C and so will return by gravity through the filter into the space between the transparent outer tube and inner tube A, all liquid ultimately accumulating in the lower end of the transparent tube. Any appreciable collection of liquid in the outer tube can be discharged by slacking off the lower locking nut $G^2$ so that the seal can be broken between the lower end of the transparent tube and its cap, thus permitting the liquid to be discharged.

Discharge openings may be formed in the lower cap instead of the cap being longitudinally movable in the manner described and of course a tubular extension on the cap which is internally screwthreaded can be employed instead of the lock nut illustrated.

Although the invention is particularly suitable for use with portable apparatus for detecting explosive gas, obviously the construction described can be used with other apparatus for sampling or testing gases without departing from the invention.

What I claim as my invention and desire to secure by Letters Patent is:

1. A liquid trap for use with the sampling line of a gas-detecting apparatus comprising an inner tube adapted to lie in an approximately vertical or steeply inclined position and to be connected at its upper and lower ends to the sampling line, an outer tube surrounding and spaced from the inner tube and supported at its ends thereon in a liquid-tight manner, a plug in the bore of the inner tube with upper and lower openings in the inner tube respectively above and below the plug for the passage of gas, the lower opening being spaced from the lower end of the tube by a substantial distance and the inner tube below said opening being imperforate, and an annular baffle mounted on the inner tube in a liquid-tight manner at a point between the upper and lower openings with its outer edge spaced from both inner and outer tubes.

2. A liquid trap for use with the sampling line of a gas-detecting apparatus comprising an inner tube adapted to lie in an approximately vertical or steeply inclined position and to be connected at its upper and lower ends to the sampling line, an outer tube surrounding and spaced from the inner tube and supported at its ends thereon in a liquid-tight manner, a plug in the bore of the inner tube with upper and lower openings in the inner tube respectively above and below the plug for the passage of gas, the lower opening being spaced from the lower end of the tube by a substantial distance and the inner tube below said opening being imperforate, an annular baffle mounted on the inner tube in a liquid-tight manner at a point between the upper and lower openings with its outer edge spaced from both inner and outer tubes, and a downwardly directed flange extending from the edge of the baffle.

3. A liquid trap for use with the sampling line of a gas-detecting apparatus comprising an inner tube adapted to lie in an approximately vertical or steeply inclined position and to be connected at its upper and lower ends to the sampling line, an outer tube surrounding and spaced from the inner tube and supported at its ends thereon in a liquid-tight manner, a plug in the bore of the inner tube with an upper opening in the tube having its lower edge level with the top of the plug and a lower opening in the tube below the plug, the lower opening being spaced from the lower end of the tube by a substantial distance and the tube below said opening being imperforate, and an annular baffle mounted on the inner tube in a liquid-tight manner between the upper and lower openings with its outer edge spaced from both inner and outer tubes.

4. A liquid trap for use with the sampling line of a gas-detecting apparatus comprising an inner tube adapted to lie in an approximately vertical or steeply inclined position and to be connected at its upper and lower ends to the sampling line, an outer tube surrounding and spaced from the inner tube and supported at its ends thereon in a liquid-tight manner, a plug in the bore of the inner tube with an upper opening in the tube having its lower edge level with the top of the plug and a lower opening in the tube below the plug, the lower opening being spaced from the lower end of the tube by a substantial distance and the tube below it being imperforate, an annular baffle mounted on the inner tube in a liquid-tight manner between the upper and lower openings with its outer edge spaced from both inner and outer tubes, and a flange extending downwards from the edge of the baffle.

5. A liquid trap for use with the sampling line of a gas-detecting apparatus comprising an inner tube adapted to lie in an approximately vertical or steeply inclined position and to be connected at its upper and lower ends to the gas sampling line, an outer tube of transparent material surrounding and spaced from the inner tube and supported at its ends thereon in a liquid-tight manner, a plug in the bore of the inner tube with upper and lower openings in the inner tube respectively above and below the plug for the passage of the gas, the lower opening being spaced from the lower end of the tube by a substantial distance and the tube below said opening being imperforate, an annular baffle mounted on the inner tube in a liquid-tight manner between the upper and lower openings, with its outer edge spaced from both inner and outer tubes, and means whereby liquid which collects in the outer tube can be discharged.

6. A liquid trap for use with the sampling line of a gas-detecting apparatus comprising an inner tube adapted to lie in an approximately vertical or steeply inclined position and to be connected at its upper and lower ends to the sampling line, an outer tube surrounding and spaced from the inner tube and supported at its ends thereon in a liquid-tight manner, a plug in the bore of the inner tube with upper and lower openings in the inner tube respectively above and below the plug for the passage of gas, the lower opening being spaced from the lower end of the tube by a substantial distance and the tube below the opening being imperforate, an annular baffle mounted on the inner tube in a liquid-tight manner at a point between the upper and lower openings with its outer edge spaced from both inner and outer tubes, and a filter surrounding the part of the inner tube in which the upper opening is formed.

7. A liquid trap for use with the sampling line of a gas-detecting apparatus comprising an inner tube adapted to lie in an approximately vertical and steeply inclined position and to be connected at its upper and lower ends to the sampling line, an outer tube surrounding and spaced from the inner tube and supported at its ends thereon in a liquid-tight manner, a plug in the bore of the inner tube with upper and lower openings in the inner tube respectively above and below the plug for the passage of gas, the lower opening being spaced from the lower end of the tube by a substantial distance and the tube below said opening being imperforate, an annular baffle mounted on the inner tube in a liquid-tight manner at a point between the upper and lower openings with its outer edge spaced from both inner and outer tubes, a downwardly directed flange extending from the edge of the baffle, and a filter surrounding the part of the inner tube in which the upper opening is formed.

8. A liquid trap for use with the sampling line of a gas-detecting apparatus comprising an inner tube adapted to lie in an approximately vertical or steeply inclined position and to be connected at its upper and lower ends to the gas sampling line, an outer tube surrounding and spaced from the inner tube, flanges closing the ends of the outer tube and engaging the inner tube so as to support the outer tube thereon in a liquid-tight manner, a plug in the bore of the inner tube with an upper opening in the tube the lower edge of which is flush with the upper end of the plug and a lower opening in the tube situated below the plug, the lower opening being spaced from the lower end of the tube by a substantial distance and the tube below said opening being imperforate, an annular baffle mounted on the inner tube in a liquid-tight manner between the upper and lower openings with its outer edge spaced from both inner and outer tubes, a filter surrounding the part of the inner tube in which the upper opening is formed, and a flange extending downwards from the edge of the baffle.

RALPH POOLE.